United States Patent [19]

Moser

[11] 4,050,886

[45] Sept. 27, 1977

[54] ROLL FUSER

[75] Inventor: Rabin Moser, Fairport, N.Y.

[73] Assignee: Xerox Corporation, Stamford, Conn.

[21] Appl. No.: 726,328

[22] Filed: Sept. 24, 1976

[51] Int. Cl.$^2$ .................... F27B 9/28; B60B 5/00

[52] U.S. Cl. .................... 432/60; 29/121.1; 29/121.6; 29/132; 219/469; 100/176; 355/3 FU

[58] Field of Search .................... 432/59, 60, 227, 228; 355/3 FU; 219/216, 469; 100/93 RP, 176, 155 R; 29/121.6, 121.1, 129.5, 132

[56] References Cited

U.S. PATENT DOCUMENTS

| | | | |
|---|---|---|---|
| 949,437 | 2/1910 | Munk | 29/121.6 |
| 1,394,684 | 10/1921 | Matsuo | 29/121.1 |
| 3,447,221 | 6/1969 | Odiorne | 29/121.1 |
| 3,904,354 | 9/1975 | Moser | 432/60 |

OTHER PUBLICATIONS

IBM Technical Disclosure Bulletin, vol. 16, No. 3, Aug. 1973, p. 896, *Roll Fuser* by Fathergill et al.

*Primary Examiner*—John J. Camby
*Assistant Examiner*—Henry C. Yuen

[57] ABSTRACT

A xerographic reproducing apparatus comprising a roll fuser structure comprising a heated roll cooperating with a backup roll to form a nip through which copy substrates are moved with toner images contained thereon contacting the heated fuser roll to thereby tackify the toner for subsequent fusing to the copy substrate upon cooling of the toner. The roll fuser is characterized by the provision of a resilient outer layer which has a non-uniform surface which layer is applied to a rigid core having a non-uniform surface which is complementary to the non-uniform surface of the silicone rubber layer. The non-uniform surfaces allow the silicone rubber to have alternate thick and thin portions along the longitudinal axis thereof which portions set up a strain pattern on the roll surface as the surface moves through the nip such that the copy substrate which tends to adhere to the fuser roll is stripped from the roll as the strained portions of the rubber layer return to their normal shape after passing through the nip.

7 Claims, 4 Drawing Figures

ROLL FUSER

BACKGROUND OF THE INVENTION

This invention relates to roll fuser apparatus for use in a xerographic reproducing apparatus and particularly, to means for stripping copy paper from the heated roll thereof in order to prevent the paper from curling and wrapping around the fuser roll.

In the process of xerography, a light image of an original to be copied is typically recorded in the form of a latent electrostatic image upon a photosensitive member with subsequent rendering of the latent image visible by the application of electroscopic marking particles, commonly referred to as toner. The visual image can be either fixed directly upon the photosensitive member or transferred from the member to a sheet of plain paper with subsequent affixing of the image thereto.

In order to permanently affix or fuse an electroscopic toner material onto a support member by heat, it is necessary to elevate the temperature of the toner material to a point at which the constituents of the toner material coalesce and become tacky. This action causes the toner to be absorbed to some extent into the fibers of the support member which in many instances constitutes plain papers. Thereafter, as the toner material is cooled, solidification of the toner material occurs causing the toner material to be firmly bonded to the support member.

In both the electrographic as well as the xerographic recording arts, the use of thermal energy for fixing toner images onto a support member is old and well-known.

One approach to thermal fusing of electroscopic toner images onto a support has been to pass the support with the toner images thereon between a pair of opposed roller members, at least one of which is either externally or internally heated.

During operation of a fusing system of the above-described type, the support member to which the toner images are electrostatically adhered is moved through the nip formed between the rolls with the toner image contacting the fuser roll to thereby provide heating of the toner image within the nip. By controlling the heat transferred to the toner and by the provision of proper roll surface materials virtually no offsetting of the toner particles from the copy sheet to the fuser roll is experienced under normal conditions. This is because the heat applied to the surface of the roller is insufficient to raise the temperature of the surface of the roller above the hot offset temperature of the toner whereat the toner particles in the image areas of the toner would liquify and cause a shearing action in the molten toner to thereby result in offset. Shearing occurs when the interparticle forces holding the viscous toner mass together is less than the surface energy forces tending to offset it to a contacting surface such as the fuser roll.

Occasionally, however, extraneous toner particles will be offset to the fuser roll by an insufficient application of heat to the surface thereof, by imperfections in the properties of the entire surface of the roll, or by the toner particles insufficiently adhering to the copy sheet by the electrostatic forces which normally hold them there. In such a case, extraneous toner particles may be transferred to the surface of the fuser roll beyond the nip, with subsequent transfer to the backup roll during periods of time when no copy paper is in the nip and before the backup roll can be moved out of contact with the fuser roll.

It will be appreciated that in order to prevent such toner particles being transferred to the copy paper it is necessary to remove the toner particles from the fuser roll and/or the backup roll. It will be further appreciated that if enough toner accumulates on the backup roll the paper feed will be affected.

One arrangement for minimizing the foregoing phenomena, commonly referred to as "offsetting" has been to provide a fuser roll with an outer covering or sleeve of polytetrafluoroethylene, commonly known as Teflon, to which a release agent such as silicone oil is applied. Silicone based oils, which possess a relatively low surface energy, have been found to be a material that is suitable for use in the heated roll fuser environment. In practice, a thin layer of silicone oil is applied to the surface of the heated roll to thereby form an interface between the roll surface and the toner images carried on the support material. Thus, a low surface energy layer is presented to the toner as it passes through the fuser nip and thereby prevents toner from adhering to the fuser roll surface. Although the low surface energy oils generally act as non-wetting fluids in regard to most support materials it has been found that a mechanical flowing of the release agent from the roll onto the support material will occur if an excess of oils is allowed to accumulate in a region where it can come into contact with the copy paper. Accordingly, the amount of oil applied to the roll surface is generally metered under controlled conditions to maintain a relatively thin coating of the release agent on the roll surface.

As the copy sheet passes out of the nip formed between the heated fuser roll and the backup roll it is necessary to provide means for insuring that the copy paper proceeds along a predetermined path from the aforementioned nip to a conveyor belt or the like for moving the copy paper toward the exit of the machine.

It has been the practice in prior art devices to employ stripper fingers for the purpose of stripping the copy paper from the heated fuser roll and for also guiding the copy paper from the nip area to the conveyor belt or the like. In order to strip the copy paper by means of stripper fingers it is necessary that the leading edges of the stripper fingers contact the surface of the fuser roll such that they can become interposed between the roll surface and the copy paper. It will be appreciated that such contacting of the fuser roll surface has attendant disadvantages, for example, they cause the fuser roll surface to wear due to frictional contact and sometimes due to gouging of the roll surface, particularly, when the roll is used in a dry (i.e. without release agent) fuser system and where the fuser roll outer surface comprises a high coefficient of friction material such as silicone rubber.

An integral stripping mechanism provided in the surface of the fuser roll member is disclosed in U.S. Pat. No. 3,904,354. In the aforementioned patent the surface of the fuser roll member is provided with a plurality of annular ridges which are deformable as the ridges move through the nip formed between the two fuser roll members to thereby provide a uniform surface in the nip. As the portions of the ridges move out of the nip they resume their normal protruding relationship and thereby effect stripping of the copy paper from the fuser roll member.

Another method of stripping copy substrates from a resilient fuser roll is to apply a brake to the driven roll thereby increasing the torque transmitted between the two rolls which has the effect of stripping substrates from the surface of the roll due to the stresses set up in the roll by virtue of the braking action.

It is the principal object of this invention to provide an improved roll fusing device for fixing toner images to a substrate in an electrostatic reproducing apparatus.

Another object of this invention is to provide an improved means for removing copy paper from the surface of the heated fuser roll.

Yet another object of this invention is to provide means for stripping copy paper from a heated fuser roll wherein such means forms an integral part of the heated fuser roll.

BRIEF SUMMARY OF THE INVENTION

Briefly, the above-cited objects are accomplished by the provision of a roll fuser apparatus comprising a heated fuser roll structure having a silicone rubber layer applied to a rigid core member with a heating element supported internally thereof to thereby heat the outer surface of the silicone rubber layer. The inner surface of the silicone rubber has an irregular surface which is complementary to the outer surface of the core member which also has an irregular surface. By the provision of such an interface between the silicone rubber layer and the core, the rubber layer has alternate thick and thin deformable portions of silicone rubber along the longitudinal axis of the fuser roll structure, the thick and thin portions having different degrees of deformability.

The pitch of the irregular surface of the core is no less than the maximum thickness of the silicone rubber and is preferably on the order of 0.5 to 1.5 inch where the maximum thickness of the silicone rubber is 0.2 inch.

By providing alternate thick and thin areas of silicone rubber along the longitudinal axis of the fuser roll structure adjacent areas (i.e. a thick area and a thin area) are distorted to a different degree as they move through the nip formed with a harder substantially non-resilient backup roll.

In order to understand the theory behind the inherent stripping capability of the proposed construction one may consider the functioning of two separate and distinct rolls one of which has a relatively thin rubber layer and the other of which has a relatively thick rubber layer. If the foregoing rolls are provided with backup rolls which are rotated at the same angular velocity then the two resilient rolls will rotate at different angular velocities due to the difference in rubber thickness. Now, if these two rolls are tied together or made into a single roll so the different thicknesses have to rotate at the same angular velocity, it will be appreciated that the difference in the thickness of rubber will have a differential stressing effect as the rubber passes through the nip formed with the backup roll. It is this differential stressing of the rubber which causes the paper to be stripped from the fuser roll structure as it passes through and out of the nip.

For a better understanding of the present invention as well as other objects and further features thereof, reference may be had to the following detailed description of the invention to be read in conjunction with the accompanying drawings wherein.

DETAILED DESCRIPTION OF THE INVENTION

Figure 1:
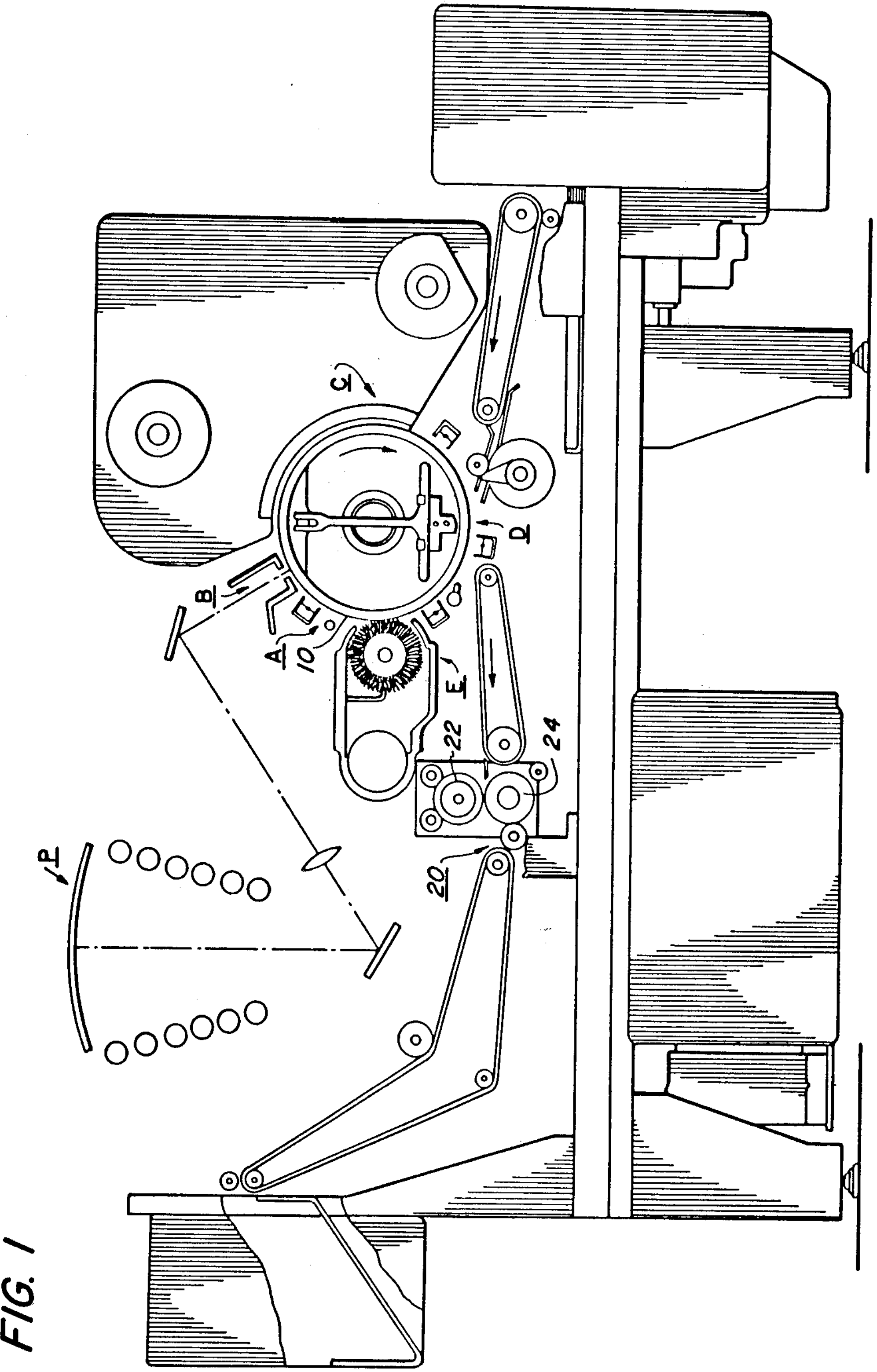
FIG. 1 is a side elevational view of a xerographic reproducing apparatus incorporating the present invention.

For a general understanding of the apparatus incorporating the improved fusing device, reference may be had to FIG. 1 in which the various system components for the xerographic copying apparatus are schematically illustrated. In the apparatus illustrated, a light image of a document to be reproduced is projected onto the sensitized surface of a xerographic plate to form an electrostatic latent image thereon. Thereafter, the latent image is developed with an oppositely charged developing material to form a xerographic powder image corresponding to the latent image on the plate surface. The powder image is then electrostatically transferred to a support surface to which it is fused whereby the powder is caused to permanently adhere to the support surface, which surface usually comprises plain paper.

In the illustrated apparatus, an original to be copied is placed upon a transparent support platen P fixedly arranged in an illumination assembly and image rays are projected by means of an optical system for exposing the photosensitive surface of a xerographic plate in the form of a drum generally indicated by the reference numeral 10.

The drum 10 is mounted upon the frame of the machine and is adapted to rotate in the direction of the arrow at a constant rate. During this movement of the drum, it passes a charging station A where a uniform electrostatic charge is applied to the surface thereof. Next to an exposure station B, exposure of the drum surface to the light image discharges the xerographic plate in the areas struck by light, whereby there remains on the surface a latent electrostatic image in image configuration corresponding to the light image projected from the original on the supporting platen. As the drum surface continues its movement, the electrostatic images pass through a developing station C in which there is positioned a developer assembly. The developer assembly delivers developing material to the upper part of the drum whereat the material is directed to cascade over the drum surface in order to provide development of the electrostatic image. As the developing material is cascaded over the drum surface toner particles in the development material are deposited on the surface to form powder images.

The developed electrostatic image is transported by the drum to a transfer station D whereat a sheet of copy paper is moved at a speed in synchronism with the moving belt in order to accomplish transfer of the developed image. There is provided at this station a sheet transport mechanism adapted to transport sheets of paper from a paper handling mechanism to the developed image on the drum at the station D.

After the sheet is stripped from the drum, it is conveyed to a fuser apparatus generally indicated by the reference numeral 20 whereat the developed and transferred xerographic powder image on the sheet material is permanently affixed thereto as will be described more fully hereinafter. After fusing, the finished copy is discharged from the apparatus by a belt conveyor to a suitable point for collection externally of the apparatus. Suitable drive means are arranged to drive the drum in conjunction with timed exposure of an original to be copied, to effect conveying and cascading of toner material to separate and feed sheets of paper and to transport the same across the transfer station D and to convey the sheet of paper through the fuser apparatus in timed sequence to produce copies of the original.

Figure 2:
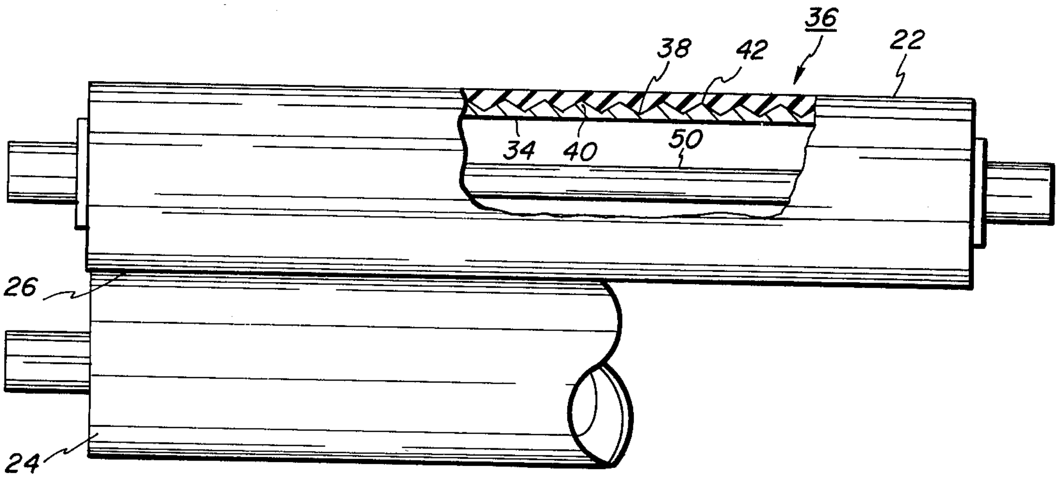
FIG. 2 is a front elevational view, partly in section, of a fuser representing the invention.

The fuser apparatus 20, as illustrated in FIG. 2, comprises a fuser roll 22 and a backup roll or pressure roll 24 having a nip 26 defined therebetween through which copy paper (not shown) is moved in order to permanently affix images of toner particles 30 thereto.

The copy paper 28 having the toner images electrostatically adhered thereto is moved to the nip 26 by means of a conveyor belt 32 which receives the copy paper from the photosensitive member 10, herein disclosed by way of example as a drum structure.

The fuser roll 22 may be fabricated from any conventional material whereby a roll structure is provided which comprises a rigid, heat conductive core or support overcoated with an abhesive layer 36. The conductive core may, for example, comprise aluminum or copper while the abhesive layer 36 may comprise silicone rubber.

The abhesive layer 36 is provided at the interior circumference thereof with an irregular shape delineated by a plurality of triangular-shaped areas 38 while the rigid core 34 is provided on the exterior surface thereof with a plurality of triangular-shaped areas 40 which are complementary to the triangular-shaped areas 38 of the silicone rubber layer. As can be seen from FIG. 2 the triangular-shaped areas extend along the longitudinal axis of the fuser roll structure whereby the layer 36 has alternate thick portions (i.e. areas 38) of silicone and thin portions 42.

In a typical fuser roll structure having an outside diameter of two inches, the maximum rubber thickness in the area 38 is on the order of 0.2 inch and the pitch (i.e., distance between adjacent apexes of the triangular areas 38 or 40) is on the order of 0.5 to 1.5 inch. It has been found that if the pitch is on the order of half the fuser roll length, one could expect the copy paper to wrinkle due to the differential stressing of the layer 36 of silicone rubber, in the nip. On the other hand, if the pitch is on the order of the rubber thickness, neighboring or adjacent thick and thin sections of the rubber will have a restraining effect on the strain magnitude and will therefore effect stripping of the copy paper without inducing wrinkles into the copy paper.

Power is supplied to a heating element 50 such that during operation of the outermost surface temperature is on the order of 200°–400° F.

While the heating source has been disclosed as being internal, it will be appreciated that an external source would give satisfactory results.

The backup or pressure roll 24 comprises a rigid support 40 having a layer of polytetrafluoroethylene 42 thereon.

Figure 3:
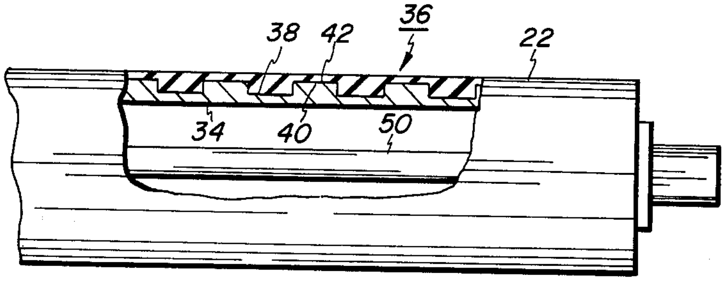
FIG. 3 is a fragmentary view of a modified fuser roll structure.
Figure 4:
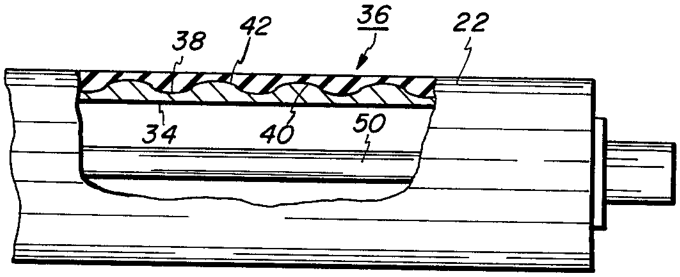
FIG. 4 is a fragmentary view of another modified fuser roll structure.

While the invention has been disclosed with reference to the preferred embodiments it will be appreciated by those skilled in the art that further modifications and advantages of the present invention may be had without departing from the spirit and scope thereof. For example, the fuser roll structure may be fabricated in accordance with the embodiments illustrated in FIGS. 3 and 4 wherein the same reference characters are employed to designate corresponding elements of the fuser roll structure. Accordingly, it is intended that such modifications and advantages be covered by the claims appended hereto.

What is claimed is:

1. In a fuser apparatus for fixing toner images to copy substrates including a heated roll structure and a backup roll structure forming a nip through which said substrates move with said toner images contacting said heated roll structure, the improvement comprising:

one of said roll structures having an outer resilient layer affixed to a rigid core wherein the inner surface of said outer resilient layer is irregularly shaped and the outer surface of said core has a shape complementary thereto, the irregularly shaped inner surface providing said resilient layer with alternate thick and thin portions along the longitudinal axis of said one of said roll structures whereby a structure is provided which strips said substrates therefrom as the substrates pass through said nip; said irregularly shaped inner surface comprising a plurality of similarly shaped areas the distance between corresponding parts of which is greater than the thickness of said resilient layer.

2. Apparatus according to claim 1 wherein the thickness of said resilient layer is on the order of 0.2 inch and said distance is on the order of 0.5 to 1.5 inch.

3. Apparatus according to claim 2 wherein said one of said roll structures comprises said heated roll structure.

4. Apparatus according to claim 3 wherein said resilient layer comprises silicone rubber.

5. Apparatus according to claim 4 including means supported internally of said heated roll structure for elevating the outer surface thereof to an operating temperature.

6. Apparatus according to claim 5 wherein said core comprises aluminum.

7. Apparatus according to claim 6 wherein said similarly shaped areas are triangular.

* * * * *